United States Patent
Oh et al.

(10) Patent No.: US 6,665,036 B2
(45) Date of Patent: *Dec. 16, 2003

(54) IN-PLANE SWITCHING MODE LIQUID CRYSTAL DISPLAY DEVICE HAVING PARTICULAR COMMON ELECTRODES

(75) Inventors: Young Jin Oh, Kyungki-do (KR); Jae Beom Choi, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/846,324

(22) Filed: May 2, 2001

(65) Prior Publication Data

US 2002/0126246 A1 Sep. 12, 2002

Related U.S. Application Data

(63) Continuation of application No. 09/079,895, filed on May 15, 1998.

(30) Foreign Application Priority Data

May 19, 1997 (KR) .............................. 97-19201

(51) Int. Cl.[7] ...................... G02F 1/1343; G02F 1/136
(52) U.S. Cl. ...................... 349/141; 349/143; 349/43
(58) Field of Search .................... 349/141, 143, 349/42, 43, 123, 129

(56) References Cited

U.S. PATENT DOCUMENTS

| | | |
|---|---|---|
| 4,239,346 A | 12/1980 | Lloyd |
| 4,726,659 A | 2/1988 | Conrad et al. |

(List continued on next page.)

FOREIGN PATENT DOCUMENTS

| | | |
|---|---|---|
| EP | 0 368 260 | 5/1990 |
| EP | 0 588 568 | 3/1994 |
| EP | 0 749 029 | 12/1996 |
| JP | 62-78532 | 4/1987 |

(List continued on next page.)

OTHER PUBLICATIONS

R. Kiefer, et al., *In–Plane Switching of Nematic Liquid Crystals*, Japan Display '92, pp. 547–550.

M. Oh–e, et al., *Principles and Characteristics of Electro–Optical Behaviour with In–Plane Switching Mode*, Asia Display '95, pp. 577–580.

(List continued on next page.)

*Primary Examiner*—Robert H. Kim
*Assistant Examiner*—Mike Qi
(74) *Attorney, Agent, or Firm*—McKenna Long & Aldridge LLP

(57) ABSTRACT

An in-plane switching mode liquid crystal display device includes first and second substrates and a plurality of gate and data bus lines defining pixel regions and arranged perpendicularly and/or horizontally on the first substrate. A common line is formed with the gate bus line, and a plurality of thin film transistors are formed at respective crossing areas of the gate and data bus lines. A plurality of gate electrodes are connected to the gate bus lines, and a gate insulator having a contact hole on the gate electrodes. A transparent first metal layer including a plurality of first electrodes is on the gate insulator. A passivation layer having a contact hole is on the first metal layer. A transparent second metal layer including a plurality of second electrodes is on the passivation layer. A black matrix for preventing light from leaking around the thin film transistor, the gate bus line, and data bus line is on the second substrate. A color filter layer is on the second substrate, and a liquid crystal layer is between the first and second substrates.

5 Claims, 4 Drawing Sheets

U.S. PATENT DOCUMENTS

| | | | |
|---|---|---|---|
| 5,307,189 A | | 4/1994 | Nishiki et al. |
| 5,321,535 A | | 6/1994 | Ukai et al. |
| 5,459,596 A | | 10/1995 | Ueda et al. |
| 5,464,669 A | | 11/1995 | Kang et al. |
| 5,492,762 A | | 2/1996 | Hirai et al. |
| 5,540,784 A | | 7/1996 | Ranes |
| 5,576,858 A | | 11/1996 | Ukai et al. |
| 5,598,285 A | | 1/1997 | Kondo et al. |
| 5,600,464 A | | 2/1997 | Ohe et al. |
| 5,608,556 A | | 3/1997 | Koma |
| 5,646,705 A | | 7/1997 | Higuchi et al. |
| 5,686,019 A | | 11/1997 | Nakamura |
| 5,737,051 A | | 4/1998 | Kondo et al. |
| 5,742,369 A | | 4/1998 | Mihara et al. |
| 5,745,207 A | | 4/1998 | Asada et al. |
| 5,757,455 A | | 5/1998 | Sugiyama et al. |
| 5,760,856 A | | 6/1998 | Yanagawa et al. |
| 5,760,857 A | | 6/1998 | Yanagawa et al. |
| 5,781,261 A | | 7/1998 | Ohta et al. |
| 5,786,876 A | | 7/1998 | Ota et al. |
| 5,793,459 A | | 8/1998 | Toko |
| 5,818,560 A | | 10/1998 | Kouno et al. ............ 349/129 |
| 5,831,701 A | | 11/1998 | Matsuyama et al. |
| 5,841,499 A | | 11/1998 | Baur et al. |
| 5,852,485 A | | 12/1998 | Shimada et al. |
| 5,859,682 A | | 1/1999 | Kim et al. |
| 5,870,160 A | | 2/1999 | Yanagawa et al. |
| 5,886,762 A | * | 3/1999 | Lee et al. ............ 349/141 |
| 5,907,379 A | * | 5/1999 | Kim et al. ............ 349/141 |
| 5,907,380 A | | 5/1999 | Lien |
| 5,910,271 A | | 6/1999 | Ohe et al. |
| 5,914,762 A | | 6/1999 | Lee et al. |
| 5,917,564 A | * | 6/1999 | Kim et al. ............ 349/46 |
| 5,946,060 A | | 8/1999 | Nishiki et al. |
| 5,946,067 A | | 8/1999 | Kim et al. |
| 5,956,111 A | | 9/1999 | Ohta et al. |
| 5,959,708 A | | 9/1999 | Lee et al. |
| 5,969,782 A | * | 10/1999 | Lee et al. ............ 349/141 |
| 5,977,562 A | | 11/1999 | Hirakata et al. |
| 5,995,186 A | | 11/1999 | Hiroshi |
| 5,995,187 A | * | 11/1999 | Wakagi et al. ............ 349/141 |
| 6,005,650 A | | 12/1999 | Kim et al. |
| 6,014,090 A | | 1/2000 | Rosen et al. |
| 6,014,190 A | * | 1/2000 | Kim et al. ............ 349/39 |
| 6,028,653 A | * | 2/2000 | Nishida ............ 349/141 |
| 6,040,887 A | | 3/2000 | Matsuyama et al. |
| 6,075,257 A | * | 6/2000 | Song ............ 257/59 |
| 6,091,473 A | | 7/2000 | Hebiguchi ............ 349/141 |
| 6,094,250 A | * | 7/2000 | Choi et al. ............ 349/141 |
| 6,111,625 A | * | 8/2000 | Ohta et al. ............ 349/141 |
| 6,259,502 B1 | * | 7/2001 | Komatsu ............ 349/141 |

FOREIGN PATENT DOCUMENTS

| | | |
|---|---|---|
| JP | 04-067127 | 3/1992 |
| JP | 06-273803 | 9/1994 |
| JP | 07-036058 | 2/1995 |
| JP | 07-225388 | 8/1995 |
| JP | 08-062586 | 3/1996 |
| JP | 09-5764 | 1/1997 |
| JP | 09-005763 | 1/1997 |
| JP | 09-005793 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-325346 | 12/1997 |
| KR | 96-32049 | 9/1996 |
| KR | 97-22458 | 5/1997 |
| KR | 1998-040330 | 8/1998 |
| KR | 98-083765 | 12/1998 |
| WO | 97/10530 | 3/1997 |

OTHER PUBLICATIONS

M. Ohta, et al., *Development of Super–TFT–LCDs with In–Plane Switching Display Mode*, Asia Display '95, pp. 707–710.

S. Matsumoto, *Display Characteristics of In–Plane–Switching (IPS) LCDs and a Wide–Viewing–Angle 14.5in. IPS TFT–LCD*, Euro Display '96, pp. 445–448.

H. Wakemoto, et al., *An Advanced In–Plane–Switching Mode TFT–LCD*, SID 97 Digest, pp. 929–932.

Japanese Abstract for JP09–269507, Oct. 14, 1997.

S.H. Lee, et al., *High–Transmittance, Wide–Viewing–Angle Nematic Liquid Crystal Controlled by Fringe–Field Switching*, Asia Display '98, pp. 371–374.

* cited by examiner

IN-PLANE SWITCHING MODE LIQUID CRYSTAL DISPLAY DEVICE HAVING PARTICULAR COMMON ELECTRODES

This application claims the benefit of Korean Application No. 1997-19201, filed on May 19, 1997, which is hereby incorporated by reference. This is a continuation of application Ser. No. 09/079,895 filed May 15, 1998.

BACKGROUND OF THE INVENTION

1. Field of the Invention

The present invention relates to a liquid crystal display device, and more particularly, to a wide viewing angle in-plane switching mode liquid crystal display device.

2. Discussion of the Related Art

Twisted nematic liquid crystal display devices(hereinafter TN LCDs) having high image quality and low consumption electric power are widely applied to flat panel display devices. TN LCDs, however, have a narrow viewing angle due to refractive anisotropy of liquid crystal molecules. This is because prior to applying voltage, liquid crystal molecules are horizontally aligned relative to the substrate but become nearly vertically aligned relative to the substrate when voltage is applied to a liquid crystal panel.

Recently, in-plane switching mode liquid crystal display devices(hereinafter IPS-LCDs) have been widely studied in which viewing angle characteristic is improved and the liquid crystal molecules are nearly horizontally aligned.

FIG. 1A is a plan view of a unit pixel of a conventional IPS-LCD. As shown in the drawing, a unit pixel region is defined by a gate bus line 1 and a data bus line 2 in which the lines are arranged perpendicularly and/or horizontally in a matrix on a first substrate 10. A common line 3 is arranged parallel to the gate bus line 1 in the pixel region. A thin film transistor(TFT) is formed of a crossing area of the data bus line 2 and the gate bus line 1. As shown in FIG. 1B which is a sectional view taken along line I–I' of FIG. 1A, the TFT includes a gate electrode 5, a gate insulator 12, a semiconductor layer 15, a channel layer 16, and source/drain electrode 6. The gate electrode 5 is connected to the gate bus line 1, and the source/drain electrode 6 is connected to the data bus line 2. The gate insulator 12 is formed on the entire surface of the first substrate 10.

A common electrode 9 and a data electrode 8 are formed in the pixel region. The common electrode 9 is formed with the gate electrode 5 and connected to the common line 3. The data electrode 8 is formed with the source/drain electrode 6 and electrically connected to the source/drain electrode 6. Further, a passivation layer 20 and a first alignment layer 23a are deposited on the entire surface of the first substrate 10.

On a second substrate 11, a black matrix 28 is formed to prevent a light leakage which may be generated around TFT, the gate bus line 1, and the data bus line 2. A color filter layer 29, and a second alignment layer 23b are formed on the black matrix 28 in sequence. Also, a liquid crystal layer 30 is formed between the first and second substrates 10, 11. When voltage is not applied to LCD having the above structure, liquid crystal molecules in the liquid crystal layer 30 are aligned according to alignment directions of the first and second alignment layers 23a, 23b, but when voltage is applied between the common electrode 9 and the data electrode 8, the liquid crystal molecules are vertically aligned to extending directions of the common and data electrode. As in the foregoing, since liquid crystal molecules in the liquid crystal layer 30 are switched on the same plane at all times, a grey inversion is not created in the viewing angle directions of up and down direction, and right and left direction.

However, in the conventional LCD having the above structure, an aperature ratio is less than desired because the data electrode and the common electrode are opaque. Also, since a short by coupling the common electrode and said gate bus line in the manufacturing process of the LCD is often generated, the yield goes downed. Further, for the gate insulator and the passivation layer between the data electrode and the common electrode, a high driving voltage for switching liquid crystal molecules is required.

SUMMARY OF THE INVENTION

Accordingly, the present invention is directed to an plane switching mode liquid crystal display device that substantially obviates one or more of the problems due to limitations and disadvantages of the related art.

An object of the present invention is to provide an LCD having a high aperature ratio.

Another object of the present invention is to increase the yield of an LCD.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these an other advantages, and in accordance with the purpose of the present invention, as embodied and broadly described, in a first aspect of the present invention there is provided an in-plane switching mode liquid crystal display device comprising first and second substrates; a plurality of gate and data bus lines defining pixel regions and arranged on said first substrate; a common line formed with said gate bus line; a plurality of thin film transistors formed at respective crossing areas of said gate and data bus lines, gate electrodes of said transistors being connected to said gate bus lines, respectively; a gate insulator having a contact hole on said gate electrodes; a transparent first metal layer including a plurality of first electrodes on said gate insulator; a passivation layer having a contact hole on said transparent first metal layer; and a transparent second metal layer including a plurality of second electrodes on said passivation layer, said second electrodes producing plane electric fields together with said first electrodes.

In another aspect of the present invention, an in-plane switching mode liquid crystal display device comprises first and second substrates; a plurality of gate and data bus lines defining pixel regions and arranged on said first substrate; a common line formed with said gate bus line; a plurality of thin film transistors formed at respective crossing areas of said gate and data bus lines, gate electrodes of said transistors being connected to said gate bus lines, respectively; a gate insulator having a contact hole on said gate electrodes; a transparent first metal layer including a plurality of first electrodes and a transparent second metal layer including a plurality of second electrodes on said gate insulator, said second electrodes producing plane electric fields together with said first electrodes on said gate insulator; and a passivation layer on said common line and said thin film transistors.

In anther aspect of the present invention, a method of forming an in-plane switching mode liquid crystal display device comprises the steps of forming first and second substrates; forming a plurality of gate and data bus lines defining pixel regions and arranged on said first substrate; forming a common line formed with said gate bus line; forming a plurality of thin film transistors formed at respective crossing areas of said gate and data bus lines, gate electrodes of said transistors being connected to said gate bus lines, respectively; forming a gate insulator having a contact hole on said gate electrodes; forming a transparent first metal layer including a plurality of first electrodes on said gate insulator; forming passivation layer having a contact hole on said transparent first metal layer; and forming transparent second metal layer including a plurality of second electrodes on said passivation layer, said second electrodes producing plane electric fields together with said first electrodes.

In a further aspect of the present invention, a method of forming an in-plane switching mode liquid crystal display device comprises the steps of forming first and second substrates; forming a plurality of gate and data bus lines defining pixel regions and arranged on said first substrate; forming a common line formed with said gate bus line; forming a plurality of thin film transistors formed at respective crossing areas of said gate and data bus lines, gate electrodes of said transistors being connected to said gate bus lines, respectively; forming a gate insulator having a contact hole on said gate electrodes; forming a transparent first metal layer including a plurality of first electrodes and a transparent second metal layer including a plurality of second electrodes on said gate insulator, said second electrodes producing plane electric fields together with said first electrodes on said gate insulator; and forming a passivation layer on said common line and said thin film transistors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The present invention preferably comprises first and second substrates, data and gate bus lines defining pixel region on the first substrate in which the lines are arranged perpendicularly and/or horizontally in a matrix, common lines formed parallel to the gate bus lines in the pixel region, TFTs at respective crossing areas of the data bus lines and the gate bus lines in the pixel region, at least one transparent data electrode in the pixel region, a passivation layer having contact holes on the data electrode, at least one transparent common electrode parallel to the data bus lines and coupled to the common line on the passivation layer, a first alignment layer with a fixed alignment direction deposited on the passivation layer, black matrixes over the second substrate to prevent a light leakage which may be generated around TFTs, the gate bus lines, and the data bus lines, a color filter layer on the black matrix and the second substrate, a second alignment layer on the color filter layer, and a liquid crystal layer between the first and second substrates.

The transparent common electrode is coupled to the common line through the contact hole, and the data electrode is coupled to the source/drain electrode of the TFT. Although the common line and common electrode are formed in different planes in one embodiment of the present invention, the common line may be formed with the common electrode in a single process using the same material in another embodiment of the present invention. When the transparent common and data electrodes are formed on the gate insulator at the same time, the common line is formed with the gate bus line in a single process using the same material and coupled to the common electrodes on the gate insulator through contact holes. Transparent conductive sections on the gate pad and the data pad connect the gate and data bus lines to an outer driving circuit. The transparent conductive sections are preferably formed with the transparent common or data electrodes at the same time.

Further, the storage capacitor according to the present invention is preferably formed by the common bus line, the data electrode over the common bus line, and the common electrode over the data electrode.

Figure 1A:
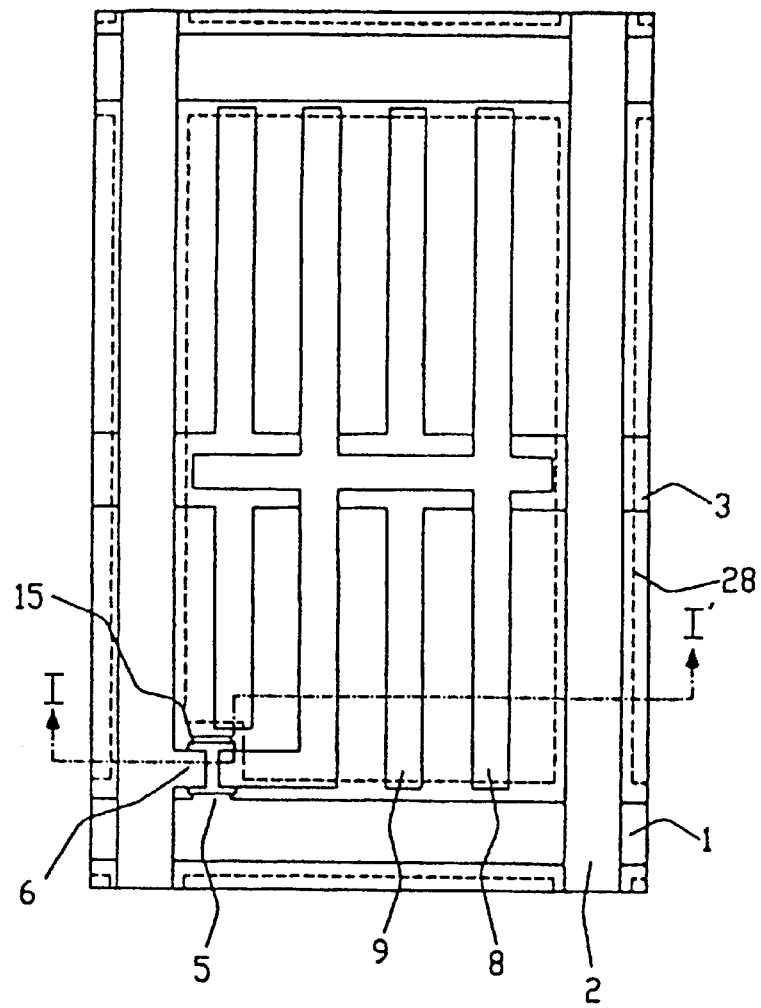
FIG. 1A is a plan view of a unit pixel of a conventional in-plane switching mode LCD.
Figure 1B:
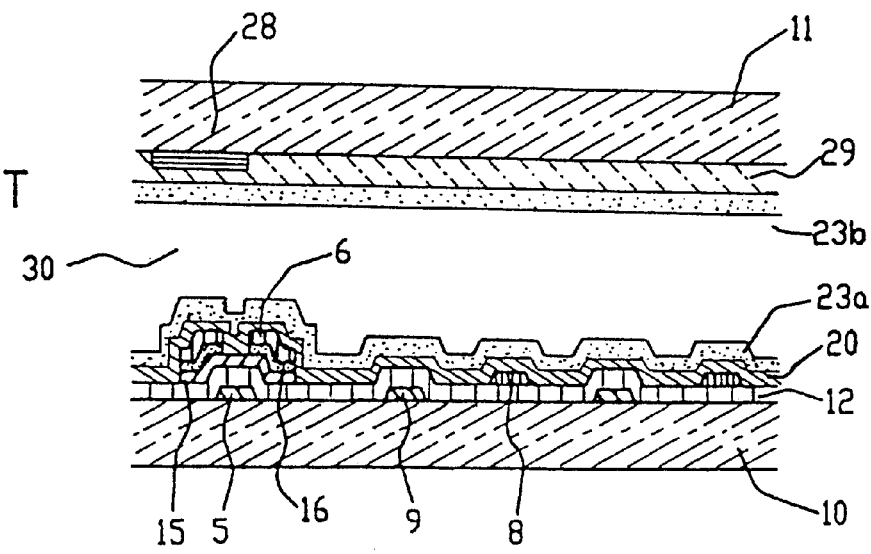
FIG. 1B is a sectional view taken along line I–I' of FIG. 1A.
Figure 2A:
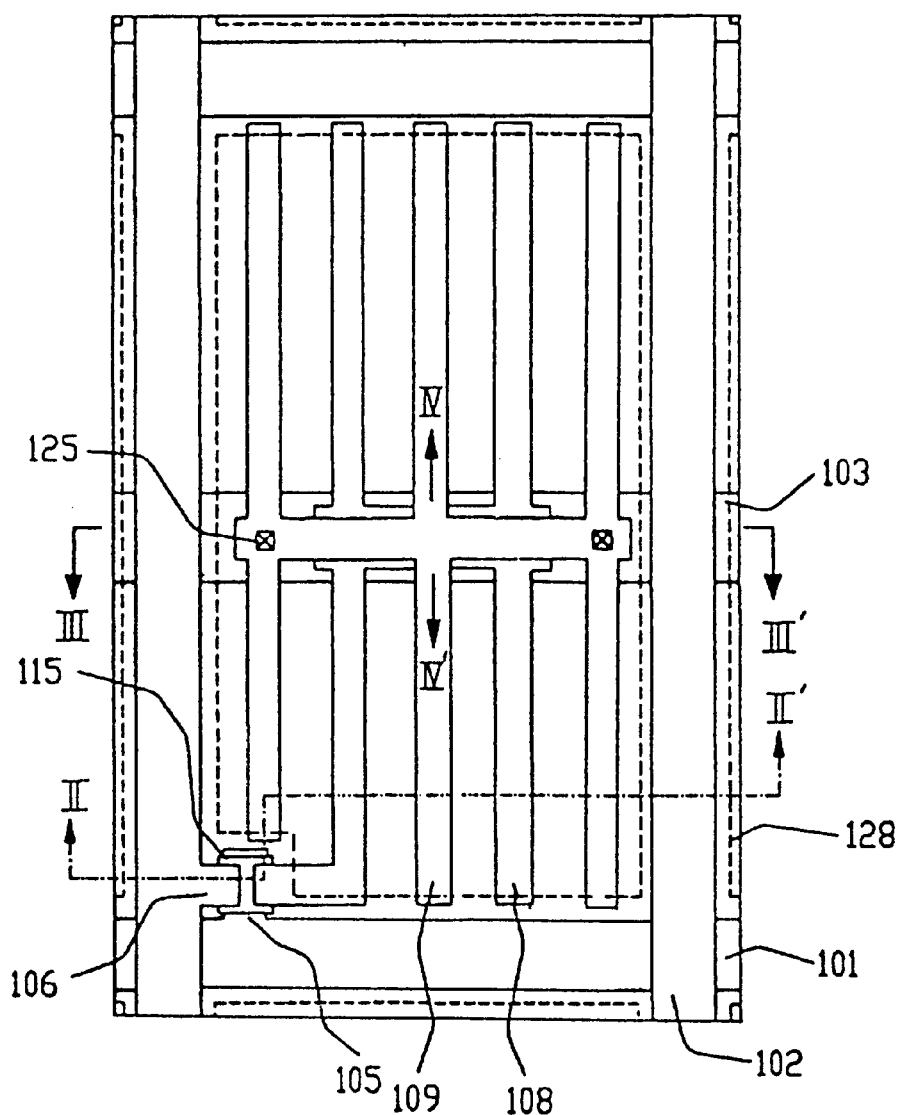
FIG. 2A is a plan view of a unit pixel of an LCD according to a first embodiment of the present invention.
Figure 2B:
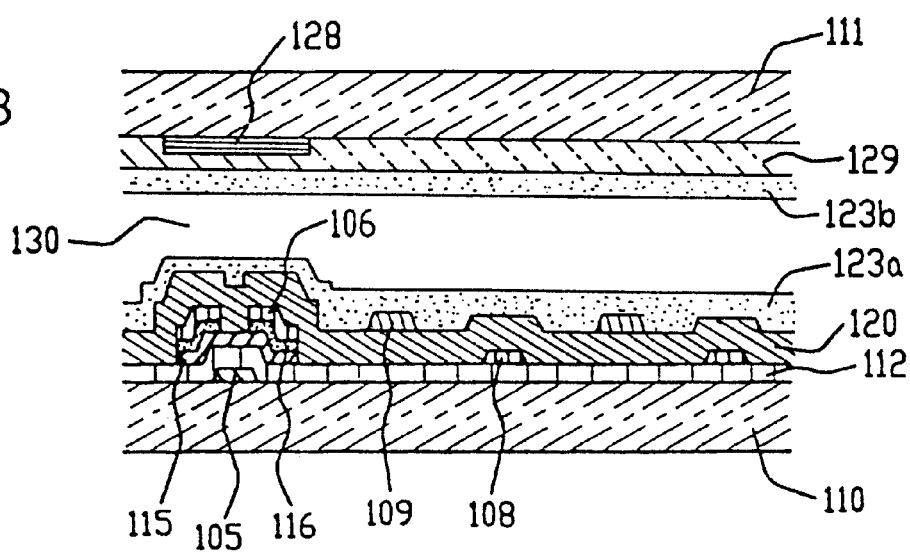
FIG. 2B is a sectional view taken along line II–II' of FIG. 2A.

FIG. 2A is a plan view of a unit pixel of a LCD according to a first embodiment of the present invention, and FIG. 2B is a sectional view taken along line II–II' of FIG. 2A. As shown in FIGS. 2A and 2B, gate and data bus lines 101, 102 defining a pixel region are arranged perpendicularly and/or horizontally in a matrix on the first substrate 110. A common line 103 is formed parallel to the gate bus line 101. A TFT is formed at a crossing area of the data bus line 102 and the gate bus line 101 in the pixel region.

As shown in FIG. 2B, the TFT preferably comprises a gate electrode 105, a gate insulator 112 on the gate electrode 105, a semiconductor layer 115 on the gate insulator 112, a channel layer 116 on the semiconductor layer 115, and source/drain electrode 106 on the channel layer 116. The gate insulator 112 is preferably deposited on the entire surface of the substrate 110.

The gate electrode 105 and the gate bus line 101 are preferably formed by sputtering and photoetching a metal such as Al, Mo, or Al alloy in a single process on a surface of the substrate. At this time, it is possible to form an anodic oxidation layer by anodizing the gate bus line 101 and the gate electrode 105 to improve the insulating characteristic. The gate insulator 112 preferably including an inorganic material such as $SiN_x$ or $SiO_x$ is formed by a PCVD (plasma chemical vapor deposition) method.

The semiconductor layer 115 is preferably formed by depositing and etching an amorphous silicon, for example, by the PCVD method, and the channel layer 116 is formed by depositing a doped amorphous silicon (n+ a-Si). The source/drain electrode 106 is preferably formed with the data electrode 108 at the same time by depositing and etching a metal such as Al, Cr, Ti, Al alloy by a sputtering method. At this time, it is possible to form each the semiconductor layer 115, the channel layer 116, and the source/drain electrode 106 by different processes. Also, it is possible that the semiconductor layer 115 and the channel layer 116 are formed by etching the a-Si layer and the n+ a-Si layer after continually depositing the a-Si layer and the n+ a-Si layer on the gate insulator 112. Furthermore, an etch stopper may be formed on the semiconductor layer 115 to prevent the channel region from being undesirably etched.

The common electrode 109 is formed on a passivation layer 120 including an inorganic material such as SiNx or SiOx, or organic material such as BCB (benzocyclobutene) by depositing and etching a transparent metal such as ITO (indium tin oxide) by using a sputtering method. Further, the first alignment layer 123a is formed on the passivation layer 120 and the common electrode 109.

On the second substrate 111, black matrix 128 for preventing a light leakage which may be generated around TFTs, the gate bus lines 101, and the data bus lines 102, a color filter layer 129, and a second alignment layer 123b is formed on the second substrate. A color filter layer 129, and a second alignment layer 123b are formed on the black matrix 128 in sequence. A liquid crystal layer 130 is formed between the first and second substrates. Further, an overcoat layer (not illustrated) may be formed on said color filter layer 129.

Figure 2C:
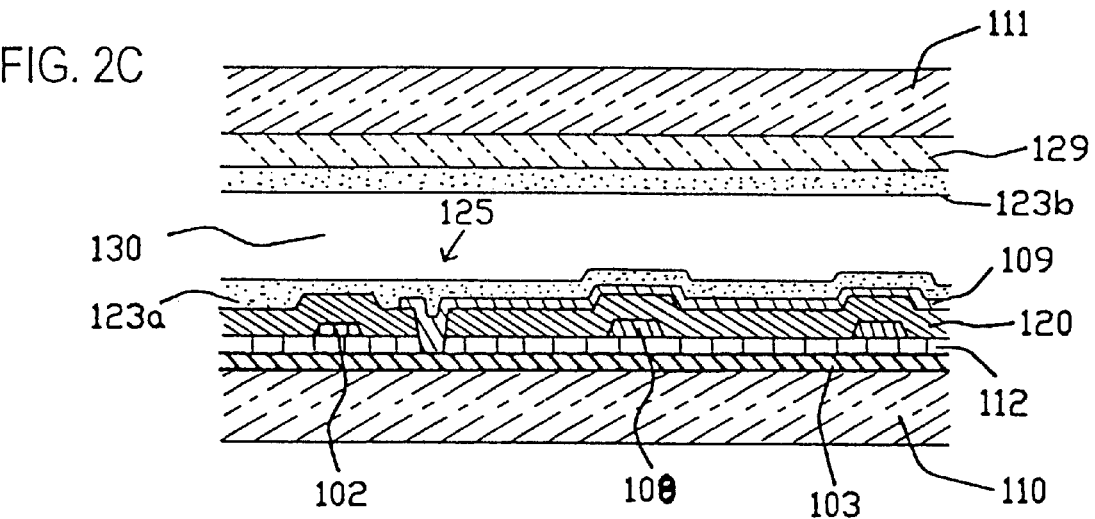
FIG. 2C is a sectional view taken along line III–III' of FIG. 2A.
Figure 2D:
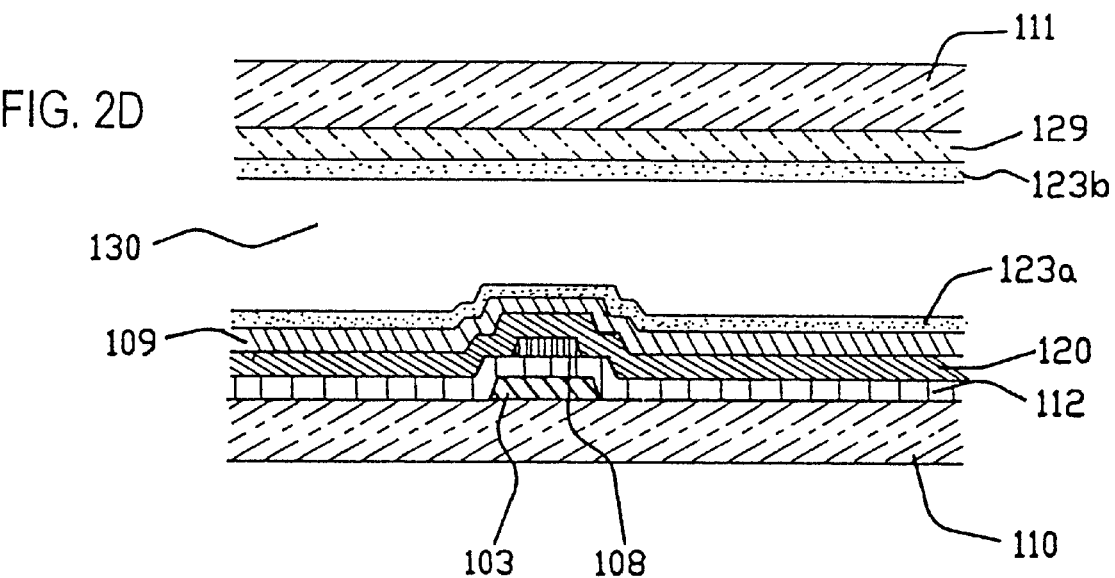
FIG. 2D is a sectional view taken along line IV–IV' of FIG. 2A.

FIG. 2C is a sectional view taken along line III–III' of FIG. 2A, and FIG. 2D is a sectional view taken along line IV–IV' of FIG. 2A. As shown in FIGS. 2C and 2D, the common electrode 109 connected to the common line 103 through a contact hole 125. In this case, a storage capacitor is formed by the common line 103 and the data electrode 108, and another storage capacitor is formed by the data electrode 108 and the common electrode 109. As a result, the aperature ratio is increased by the amount of decrease in the width of the common line 103.

Figure 3A:
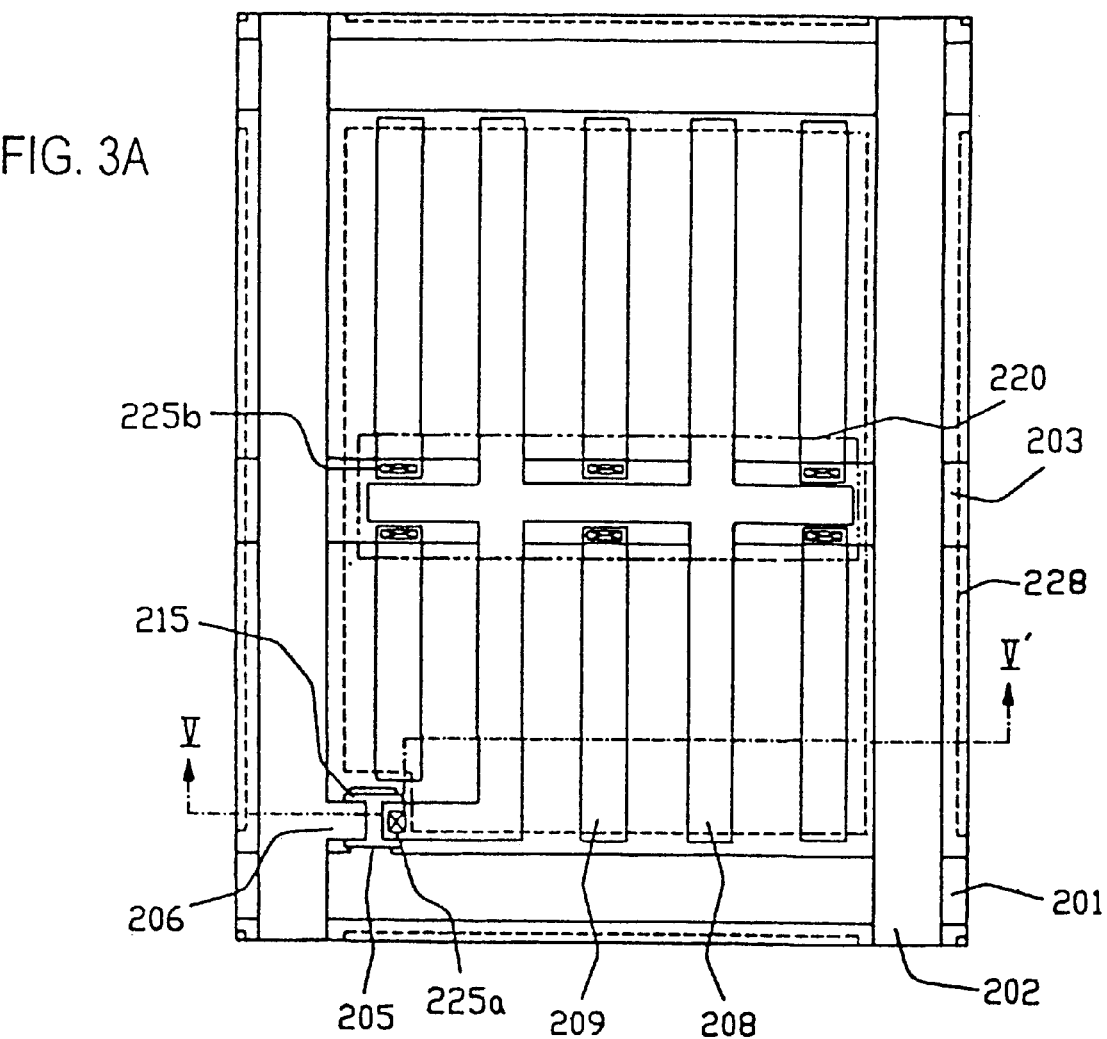
FIG. 3A is a plan view of a unit pixel of an LCD according to a second embodiment of the present invention.
Figure 3B:
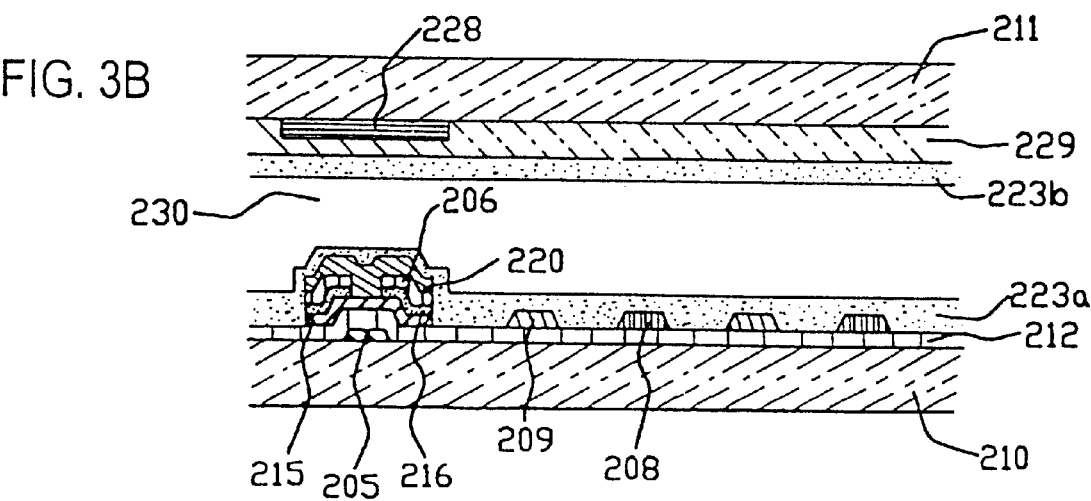
FIG. 3B is a sectional view taken along line V–V' of FIG. 3A.

FIG. 3A is a plan view of a unit pixel of a LCD according to a second embodiment of the present invention, and FIG. 3B is a sectional view taken along the V–V' of FIG. 3A.

A difference between the second embodiment and the first embodiment is that in the second embodiment, transparent common electrodes 209 and transparent data electrodes 208 are formed on a gate insulator 212, thereby improving the aperature ratio. As shown in FIG. 3A, a passivation layer 220 including an inorganic material such as SiNx or SiOx, or organic material such as BCB is formed around a common line 203. Each of the common electrodes 209 is connected to the common line 203 through a contact hole 225b. As shown in FIG. 3B, since the passivation layer 220 also formed in the TFT region as well as around the common lain 203, the data electrode 208 is connected to a source/drain electrode 206 through a contact hole 225a.

In accordance with the embodiments of the present invention, since the transparent common electrode and the transparent data electrode are formed on the gate insulator at the same time, aperature ratio is increased and a plane electric field is achieved. Further, since a strong plane electric field is applied onto the liquid crystal layer where the passivation in the pixel region is removed, it is possible to obtain an improved viewing angle and prevent a break down of the moving image by making the liquid crystal molecules to switch fast.

While the invention on has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An in-plane switching liquid crystal display device, comprising:

first and second substrates;

a plurality of gate and data bus lines defining pixel regions and arranged on the first substrate;

a common line parallel to the gate bus line;

a plurality of thin film transistors formed at respective crossing points of the gate and data bus lines, gate electrodes of the thin film transistors being connected to the gate bus lines, respectively;

a gate insulator having a contact hole on the gate electrodes;

a first transparent metal layer including a plurality of first electrodes being directly formed on the gate insulator;

a second transparent metal layer including a plurality of second electrodes on the gate insulator, the second electrodes connected to the common line through the contact hole; and a passivation layer formed around the common line.

2. The device of claim 1, wherein the passivation layer includes one of SiNx, SiOx and BCB.

3. The device of claim 1, wherein the first and second electrodes include indium tin oxide.

4. The device of claim 1, further comprising:

a black matrix layer on the second substrate;

a plurality of gate and data bus lines on the first substrate;

a common line on the first substrate;

an insulator on the first substrate;

transparent first metal layer and a transparent second metal layer on the insulator; and liquid crystal layer between the first and second substrates.

5. An in-plane switching liquid crystal display device comprising:

first and second substrates;

a plurality of gate and data bus lines defining pixel regions and arranged on the first substrate;

a common line parallel to the gate bus line;

a plurality of thin film transistor formed at respective crossing points of the gate and data bus lines, gate electrodes of the thin film transistors being connected to the gate bus lines, respectively;

an gate insulator having on a contact hole on the gate electrodes;

a first transparent metal layer including a plurality of first electrodes;

a second transparent metal layer including a plurality of second electrodes on the gate insulator, the second electrodes producing plane electric fields together with the first electrodes on the gate insulator; and a passivation layer around the common line and said thin film transistors.

* * * * *